US009346685B2

(12) United States Patent
Enomura (10) Patent No.: US 9,346,685 B2
(45) Date of Patent: May 24, 2016

(54) METHOD FOR PRODUCING SUBSTANCES TO BE SEPARATED HAVING CONTROLLED AMOUNTS OF DOPANT ELEMENT

(75) Inventor: Masakazu Enomura, Izumi (JP)

(73) Assignee: M. TECHNIQUE CO., LTD., Izumi-shi (JP)

( * ) Notice: Subject to any disclaimer, the term of this patent is extended or adjusted under 35 U.S.C. 154(b) by 708 days.

(21) Appl. No.: 13/641,425

(22) PCT Filed: May 25, 2010

(86) PCT No.: PCT/JP2010/058828
§ 371 (c)(1),
(2), (4) Date: Oct. 15, 2012

(87) PCT Pub. No.: WO2011/148463
PCT Pub. Date: Dec. 1, 2011

(65) Prior Publication Data
US 2013/0034490 A1 Feb. 7, 2013

(51) Int. Cl.
*B01D 9/00* (2006.01)
*B01D 11/04* (2006.01)
(Continued)

(52) U.S. Cl.
CPC .. *C01G 9/02* (2013.01); *B01D 9/00* (2013.01); *B01D 11/04* (2013.01); *B01J 19/1887* (2013.01);
(Continued)

(58) Field of Classification Search
CPC .... B01D 11/00; B01D 11/02; B01D 11/0269; B01D 11/0276; B01D 11/028; B01D 11/0288; B01D 11/0476; B01D 11/048; B01D 11/04; B01D 9/00; C01G 9/02; C01G 9/003; C01G 3/003; C01G 3/02; C01G 31/003; C01G 31/02; C01G 19/003; C01G 19/02; C01G 25/003; C01G 25/02; C01G 37/003; C01G 37/02; C01G 45/02; C01G 45/003; C01G 51/003; C01G 51/04; C01D 1/04; C01D 1/28; C01D 1/34; C01D 9/02; C01F 5/22; B01J 19/1887; C07F 7/10; Y10T 42/2982; B29B 7/10; B29B 7/38; B29B 7/385; B29B 9/12; B29B 2009/125; B01F 1/00; B01F 1/0005;
B01F 1/0038; B01F 3/08; B01F 3/0803; B01F 3/0861; B01F 3/0865; B01F 3/22; B01F 3/223; B01F 9/00; B01F 9/0032
USPC ............... 210/634, 639, 644, 787; 423/594.4, 423/594.5; 428/402; 556/31; 977/773, 810, 977/811; 264/5, 8, 11; 366/145, 187, 220
See application file for complete search history.

(56) References Cited

U.S. PATENT DOCUMENTS 4,803,291 A 2/1989 Rousset et al.
6,911,081 B2 * 6/2005 Andriessen .......... C09K 11/574
117/68

(Continued)

FOREIGN PATENT DOCUMENTS

EP 2 179 966 A1 4/2010
EP 2 184 772 A1 5/2010
(Continued)

OTHER PUBLICATIONS

Publication: Brian Cushing et al, "Recent Advances in the Liquid-Phase Synthesis of Inorganic Nanoparticles", Chem Rev. vol. 104, Published 2004, pp. 3893-3946.*
(Continued)

*Primary Examiner* — Joseph Drodge
(74) *Attorney, Agent, or Firm* — Birch, Stewart, Kolasch & Birch, LLP (57) ABSTRACT

A method is provided for producing separated substances, particularly metal compounds, the dopant element amounts of which have been controlled by the use of an apparatus that processes fluid between the processing surfaces of a processing member that can be made to approach/separate and which rotate relative to each other. The substance to be separated is separated by mixing a raw material solution, wherein the substance to be separated is solubilized in a solvent, with the solvent for separation and with the dopant element or dopant element-containing substance solubilized in at least one solvent selected from the solvent of said raw material solution, said solvent for separation or a solvent other than that of said raw material solution or said solution for separation. Separated substances with controlled dopant element amounts are obtained by controlling the solubility of the dopant element or dopant element-containing substance in the solvent for separation.

8 Claims, 5 Drawing Sheets

(51) Int. Cl.
*B01J 19/18* (2006.01)
*C01F 5/22* (2006.01)
*C01G 9/00* (2006.01)
*C01G 9/02* (2006.01)
*C09C 1/02* (2006.01)

(52) U.S. Cl.
CPC . *C01F 5/22* (2013.01); *C01G 9/003* (2013.01); *C09C 1/02* (2013.01); *C01P 2002/50* (2013.01); *C01P 2002/52* (2013.01); *C01P 2002/72* (2013.01); *C01P 2004/04* (2013.01); *C01P 2004/64* (2013.01); *C01P 2006/80* (2013.01)

(56) References Cited

U.S. PATENT DOCUMENTS

| | | | | |
|---|---|---|---|---|
| 8,183,299 | B2* | 5/2012 | Enomura | 516/78 |
| 8,636,974 | B2* | 1/2014 | Enomura | 423/612 |
| 8,841,352 | B2* | 9/2014 | Enomura | 516/22 |
| 2003/0118841 | A1* | 6/2003 | Horne et al. | 428/425.9 |
| 2003/0172868 | A1 | 9/2003 | Nho et al. | |
| 2003/0207978 | A1* | 11/2003 | Yadav et al. | 524/435 |
| 2004/0026319 | A1* | 2/2004 | Chattopadhyay et al. | 210/634 |
| 2006/0094189 | A1* | 5/2006 | Zurcher | B22F 9/20 438/257 |
| 2007/0034568 | A1* | 2/2007 | Foster et al. | 210/634 |
| 2008/0031832 | A1 | 2/2008 | Wakefield et al. | |
| 2008/0210902 | A1* | 9/2008 | Coy et al. | 252/182.33 |
| 2008/0299382 | A1* | 12/2008 | Moon | B82Y 20/00 428/323 |
| 2008/0311291 | A1* | 12/2008 | Schumacher et al. | 427/215 |
| 2009/0057612 | A1 | 3/2009 | Hosoba et al. | |
| 2009/0075083 | A1* | 3/2009 | Bi et al. | 428/402 |
| 2009/0320916 | A1* | 12/2009 | Yuan | C23C 18/08 136/256 |
| 2010/0135937 | A1* | 6/2010 | O'Brien et al. | 424/59 |
| 2010/0144088 | A1* | 6/2010 | Oh | B82Y 10/00 438/104 |
| 2010/0202960 | A1 | 8/2010 | Enomura | |
| 2010/0215958 | A1 | 8/2010 | Enomura | |
| 2010/0247413 | A1* | 9/2010 | Torardi | 423/263 |
| 2011/0015054 | A1 | 1/2011 | Enomura | |
| 2011/0042626 | A1 | 2/2011 | Enomura | |
| 2012/0282132 | A1* | 11/2012 | Watkins et al. | 420/416 |

FOREIGN PATENT DOCUMENTS

| | | |
|---|---|---|
| EP | 2 204 351 A1 | 7/2010 |
| JP | 57-171604 A | 10/1982 |
| JP | 63-501948 A | 8/1988 |
| JP | 7-51503 A | 2/1995 |
| JP | 10-273320 A | 10/1998 |
| JP | 10-316423 A | 12/1998 |
| JP | 10-316425 A | 12/1998 |
| JP | 10-316426 A | 12/1998 |
| JP | 2000-87122 A | 3/2000 |
| JP | 2004-160309 * | 6/2004 |
| JP | 2004-520260 A | 7/2004 |
| JP | 2004-358351 A | 12/2004 |
| JP | 2000-1774 A | 1/2006 |
| JP | 2006-183092 A | 7/2006 |
| JP | 2007-61688 A | 3/2007 |
| JP | 2007-525397 A | 9/2007 |
| JP | 2008-189537 A | 8/2008 |
| JP | 2009-74080 A | 4/2009 |
| JP | 2009-82902 A | 4/2009 |
| JP | 2009-131831 A | 6/2009 |
| JP | 2009-263719 A | 11/2009 |
| JP | 2010-17649 A | 1/2010 |
| JP | 4446128 B1 | 4/2010 |
| JP | 4446129 B1 | 4/2010 |
| WO | WO 87/02033 A1 | 4/1987 |
| WO | WO 02/090262 A1 | 11/2002 |
| WO | WO 2005/072680 A2 | 8/2005 |
| WO | WO 2009/020188 A1 | 2/2009 |
| WO | WO 2009/035019 A1 | 3/2009 |
| WO | WO 2009/038008 A1 | 3/2009 |

OTHER PUBLICATIONS

Complete English Translation of JP 2004-160309 which was published on Jun. 2004, obtained from prosecution history of U.S. Appl. No. 12/677,606.*

* cited by examiner

METHOD FOR PRODUCING SUBSTANCES TO BE SEPARATED HAVING CONTROLLED AMOUNTS OF DOPANT ELEMENT

The present invention relates to a method for separating a substance to be separated having a controlled amount of a dopant element.

BACKGROUND ART

A metal oxide, a metal salt, and a metal compound such as an organometallic compound are used in a wide range of field; especially microparticles thereof are a material which is used widely in such fields as abrasive, catalyst, cosmetics, electronic equipment, magnetic material, pigment, covering and semiconductor.

It is known that an intended property, stability, and so forth can be improved by doping a metal compound with a different element therefrom. A property of such a metal compound can be improved further by making it nanoparticles; and thus, a method for producing metal compound nanoparticles having a homogeneously controlled amount of a dopant element and also having a uniform particle diameter is eagerly wanted.

An illustrative example of a method for producing a metal oxide having a controlled amount of an dopant element includes; as described in Patent Document 1, a method comprising a step of filtering a separated substance obtained by pouring, into an excess alkali aqueous solution, a mixture solution obtained by dissolving into water and so forth a water-soluble metal salt to form a metal oxide and a water-soluble metal salt used as a metal ion for valency control or formation of a solid solution of the foregoing metal oxide and a step of burning the separated substance; and as described in Patent Document 2, a method comprising a step of contacting metal oxide microparticles with a solution containing a dopant element and a step of burning the metal oxide microparticles which is contacted with the solution containing a dopant element. However, when these methods are used, to make amount of a dopant element in each particle homogeneous is sometimes difficult. In addition, particles are readily coarsened; and thus, to produce metal oxide nanoparticles having uniform and good re-dispersibility has been difficult.

Coarsened metal oxide particles are usually crushed by mechanical abrasion or mechanical crushing treatment with such equipment as a ball mill and a bead mill as described in Patent Document 3. However, it is difficult to produce uniform nanoparticles from metal oxide particles which are produced by the method like this; and in addition, to obtain particles having a homogeneously controlled amount of a dopant element has been sometimes difficult when a doped metal oxide is crushed. In addition, because a strong crushing force is applied to particles (crystals), there has been a problem that expected properties such as semiconductor characteristics, transparency, spectroscopic characteristics, and durability are not expressed.

The problems as mentioned above appear similarly in a metal compound other than the metal oxide compound and a non-metallic substance. This applicant of the present invention provided a method for producing a metal compound by separating particles in a thin film fluid which flows between processing surfaces arranged opposite to each other, as described in Patent Document 4; but a method for producing a metal compound having a controlled amount of a dopant element was not specifically disclosed therein.

Patent Document 1: Japanese Patent Laid-Open Publication No. 2010-17649
Patent Document 2: Japanese Patent Application Publication No. 2007-525397
Patent Document 3: Japanese Patent Laid-Open Publication No. 2009-74080
Patent Document 4: International Patent Laid-Open Publication No. WO2009/020188 (semiconductor application)

DISCLOSURE OF THE INVENTION

Problems to be Solved by the Invention

The present invention was made to solve the problems mentioned above, and has an object to provide a method for producing a separated substance, especially a metal compound, having a controlled amount of a dopant element.

The inventors of the present invention carried out an extensive investigation, and as a result, found that a separated substance having a controlled amount of a dopant element could be obtained if, at the time when a fluid containing a raw material solution having a substance to be separated dissolved therein, a fluid containing a solvent for separation of this substance to be separated, and a fluid containing a third solvent which might be added as necessary, as each of them being the fluid to be processed, were mixed between processing surfaces, which were arranged opposite to each other and were capable of approaching to and separating from, to separate the substance to be separated, a dopant element or a dopant element-containing compound was dissolved in any one of a solvent for the raw material solution, the solvent for separation, and the third solvent, while solubility of the dopant element or the dopant element-containing compound to the solvent for separation was controlled.

According to a first claim of the present invention, provided is a method for separation, wherein at least two kinds of fluids are used as a fluid to be processed, at least one fluid among them is a raw material solution containing a substance to be separated dissolved therein, at least one fluid other than the foregoing fluid is at least one solvent for separation of the substance to be separated, at least one dopant element or dopant element-containing substance is dissolved in at least anyone of a solvent for the raw material solution, the solvent for separation, and at least one solvent other than the raw material solution and the solvent for separation, and two, or three or more of the fluids to be processed are mixed, whereby producing a separated substance having a controlled amount of the dopant element, wherein solubility of the dopant element or the dopant element-containing substance to the solvent for separation is controlled whereby controlling an amount of the dopant element contained in the substance to be separated, wherein the fluids to be processed are mixed in a thin film fluid formed between at least two processing surfaces which are arranged opposite to each other and are capable of approaching to and separating from, and at least one of which rotates relative to the other, whereby separating a substance to be separated having a controlled amount of a dopant element.

According to a second claim of the present invention, provided is the method for separation according to claim 1, wherein the substance to be separated is at least one metal or metal compound, and the solvent for separation is a solvent for separation of the said at least one metal or metal compound.

According to a third claim of the present invention, provided is the method for separation according to claim 1, wherein any one of the fluid containing a raw material solution and the fluid containing a solvent for separation passes through between both the processing surfaces with forming the thin film fluid, wherein a separate introduction path independent of a path through which any one of the fluids passes is provided, at least any one of the said at least two processing surfaces is provided with at least one opening leading to the introduction path, any other one of the fluid containing a raw material solution and the fluid containing a solvent for separation is introduced into between the processing surfaces through the opening, whereby mixing the fluid containing a raw material solution and the fluid containing a solvent for separation in the thin film fluid.

According to a fourth claim of the present invention, provided is the method for separation according to claim 1, wherein at least three fluids of a first, a second, and a third fluid are used as the fluid to be processed, the first fluid is a fluid containing the raw material solution, the second fluid is a solution containing the dopant element-containing substance, having at least one dopant element or dopant element-containing substance dissolved in a solvent, and the third fluid is a fluid containing the solvent for separation, wherein any one fluid of the three fluids passes through between both the processing surfaces with forming the thin film fluid, wherein at least two separate introduction paths independent of the path through which the said any one fluid passes are provided, the said at least two separate introduction paths are independent with each other, at least any one of the said at least two processing surfaces is provided with separate openings leading to each of the said at least two separate introduction paths, two rest fluids of the three fluids are introduced into between the processing surfaces through the separate openings, whereby the three fluids are mixed in the thin film fluid.

According to a fifth claim of the present invention, provided is the method for separation according to claim 4, wherein the first fluid and the third fluid are solutions not containing a dopant element or a dopant element-containing substance.

According to a sixth claim of the present invention, provided is the method for separation according to claim 1, wherein the solvent for separation is a mixed solvent of a plurality of solvents, at least one solvent in the mixed solvent is a solvent capable of dissolving the substance to be separated and the dopant element or the dopant element-containing substance, and at least one other solvent in the mixed solvent is a solvent which is capable of dissolving the substance to be separated and has a lower solubility of the dopant element or the dopant element-containing substance as compared with the said one solvent in the mixed solvent, wherein mixing ratio of the said one solvent and the said other solvent in the mixed solvent is controlled, whereby controlling an amount of the dopant element contained in the substance to be separated.

According to a seventh claim of the present invention, provided is the method for separation according to claim 1, wherein temperature of the fluid to be processed is controlled, whereby controlling an amount of the dopant element contained in the substance to be separated.

According to a eighth claim of the present invention, provided is the method for separation according to claim 1, wherein a substance to be separated not substantially containing the dopant element is separated by setting solubility of the solvent for separation to the dopant element or the dopant element-containing substance high, and this solubility which is set high is higher as compared with the case that the substance to be separated substantially containing the dopant element is separated.

Advantages

According to claims 1 to 7 of the present invention, nanoparticles of a metal compound and so forth having a controlled amount of a dopant element can be obtained more easily and with a lower energy and a lower cost than ever; and thus, a nanosized substance to be separated having a controlled amount of a dopant element can be provided cheaply and stably. In addition, because a particle diameter can be easily controlled, various kinds of nanoparticles of a metal compound and so force having a controlled amount of a dopant element in accordance with the object thereof can be provided.

In addition, according to the invention of claim 8, as one controlling embodiment of claims 1 to 7, a separated substance of a nanosized metal compound and so forth not containing a dopant element can be provided cheaply and stably even under the condition that at least one dopant element or dopant element-containing substance is dissolved in at least any one of a solvent for a raw material solution, a solvent for separation, and at least one solvent other than the raw material solution and the solvent for separation.

BEST MODES FOR CARRYING OUT THE INVENTION

Hereinafter, detailed explanation of the present invention will be made; but a technical range of the present invention is not limited by the following embodiments and Examples.

As to the substance to be separated in the present invention, metal, non-metal, or a compound of them may be mentioned. Although there is no particular restriction as to the metal, a single body or alloy of all elements in the periodic table may be mentioned. For example, metal elements such as Ti, Fe, W, Pt, Au, Cu, Ag, Pd, Ni, Mn, Co, Ru, V, Zn, and Zr may be mentioned. In addition, non-metal elements such as B, Si, Ge, N, and C may be mentioned.

Although there is no particular restriction as to the compound of the present invention, such as for example, salt, oxide, nitride, carbide, a complex, organic salt, an organic complex, and an organic compound of the metals or the non-metals mentioned above may be mentioned.

Although there is no particular restriction as to the metal salt or the non-metal salt, nitrate, nitrite, sulfate, sulfite, formate, acetate, phosphate, phosphite, hypophosphite, chloride, oxychloride, acetylacetonate, and so forth of the metals or the non-metals may be mentioned.

Although there is no particular restriction as to the metal oxide or the non-metal oxide of the present invention, such as for example, metal oxide or non-metal oxide having the formula of $M_xO_y$, metal hydroxide or a non-metal hydroxide having the formula of $M_p(OH)_q$, metal hydroxide oxide or non-metal hydroxide oxide having the formula of $M_r(OH)_sO_t$, metal acid or non-metal acid, various solvated forms of them, composition containing these substances as main components, and so forth may be mentioned (in the formulae, each of x, y, p, q, r, s, and t is an arbitrary integer).

Although there is no particular restriction as to the metal oxide or the non-metal oxide having the formula of $M_xO_y$ in the present invention, such as for example, $TiO_2$, $SnO$, $SnO_2$, $Al_2O_3$, $SiO_2$, $ZnO$, $CoO$, $CO_3O_4$, $Cu_2O$, $Ni_2O_3$, $NiO$, $MgO$, $Y_2O_3$, $VO$, $VO_2$, $V_2O_3$, $V_2O_5$, $MnO$, $MnO_2$, $CdO$, $ZrO_2$, $PdO$, $PdO_2$, $MoO_3$, $MoO_2$, $Cr_2O_3$, $CrO_3$, $In_2O_3$, or $RuO_2$ may be mentioned.

Although there is no particular restriction as to the metal hydroxide or the non-metal hydroxide having the formula of $M_p(OH)_q$ in the present invention, such as for example, $Sn(OH)_2$, $Sn(OH)_4$, $Al(OH)_3$, $Si(OH)_4$, $Zn(OH)_2$, $Co(OH)_2$, $Co(OH)_3$, $CuOH$, $Cu(OH)_2$, $Ni(OH)_3$, $Ni(OH)_2$, $Mg(OH)_2$, $Y(OH)_3$, $V(OH)_2$, $V(OH)_4$, $V(OH)_3$, $Mn(OH)_2$, $Mn(OH)_4$, $Cd(OH)_2$, $Zr(OH)_4$, $Pd(OH)_2$, $Pd(OH)_4$, $Mo(OH)_4$, $Cr(OH)_3$, and $Ru(OH)_4$ may be mentioned. Although there is no particular restriction in the metal hydroxide oxide or the non-metal hydroxide oxide having the formula of $M_r(OH)_sO_t$, $FeOOH$, $MnOOH$, $NiOOH$, $AlOOH$, and so forth may be mentioned.

Although there is no particular restriction as to the metal nitride of the present invention, such as for example, boron nitride (BN), carbon nitride ($C_3N_4$), silicon nitride ($Si_3N_4$), gallium nitride (GaN), indium nitride (InN), aluminum nitride (AlN), chromium nitride ($Cr_2N$), copper nitride ($Cu_3N$), iron nitride ($Fe_4N$), iron nitride ($Fe_3N$), lanthanum nitride (LaN), lithium nitride ($Li_3N$), magnesium nitride ($Mg_3N_2$), molybdenum nitride ($Mo_2N$), niobium nitride (NbN), tantalum nitride (TaN), titanium nitride (TiN), tungsten nitride ($W_2N$), tungsten nitride ($WN_2$), yttrium nitride (YN), and zirconium nitride (ZrN) may be mentioned.

Although there is no particular restriction in the metal carbide of the present invention, such as for example, calcium carbide ($CaC_2$), silicon carbide (SiC), boron carbide ($B_4C$), tungsten carbide (WC), tungsten carbide ($W_2C$), titanium carbide (TiC), zirconium carbide (ZrC), and vanadium carbide ($VC_x$) may be mentioned.

Metals, non-metals, and compounds of them as described above may be used as the substance to be separated or as the dopant element-containing substance of the present invention. There is no particular restriction as to the raw material solution of the present invention provided that the raw material solution is a solution in which at least one substance to be separated is dissolved therein, or at least one substance to be separated and at least one dopant element or dopant element-containing substance are dissolved therein (the term "dissolved" also includes "molecular-dispersed", but hereinafter they are collectively referred to as simply "dissolved"). The present invention may be effected by dissolving these substances to be separated into a solvent. Here, the dopant element in the present invention is not particularly restricted; it may be a metal element such as Na, Mg, Mn, Cu, Ag, Pt, Pd, B, Pb, Fe, Al, Nb, V, Sb, In, and Ga; or a non-metal element such as B, Si, Ge, N, C, P, and F; or all elements in the periodic table may be mentioned. In accordance with the aimed characteristics, these may be used singly or by selecting a plurality of them. The present invention may be effected by dissolving a dopant element or a dopant element-containing substance into the solvent of a raw material solution or into at least one solvent other than the raw material solution and the solvent for separation. Meanwhile, in claim 8 of the present invention, provided is a method for producing a metal compound not containing a dopant element even though these dopant elements or dopant element-containing substances are dissolved into at least any solvent of the raw material solution, the solvent for separation, and at least one solvent other than the raw material solution and the solvent for separation.

An illustrative example of the solvent to dissolve the substance to be separated, the dopant element and the dopant element-containing substance includes water, an organic solvent, or a mixed solvent comprising a plurality of them. An illustrative example of the water includes tap water, ion-exchanged water, pure water, ultrapure water, and RO water. An illustrative example of the organic solvent includes an alcohol compound solvent, an amide compound solvent, a ketone compound solvent, an ether compound solvent, an aromatic compound solvent, carbon disulfide, an aliphatic compound solvent, a nitrile compound solvent, a sulfoxide compound solvent, a halogen-containing compound solvent, an ester compound solvent, an ionic liquid, a carboxylic acid compound, and a sulfonic acid compound. These solvents may be used separately or as a mixture of a plurality of them.

In addition, the afore-mentioned solvents containing an acidic substance or a basic substance mixed or dissolved therein may be used. An illustrative example of the basic substance includes a metal hydroxide such as sodium hydroxide and potassium hydroxide; a metal alkoxide such as sodium methoxide and sodium isopropoxide; and an amine compound such as triethylamine, 2-diethylamino ethanol, and diethylamine. An illustrative example of the acidic substance includes an inorganic acid such as aqua regia, hydrochloric acid, nitric acid, fuming nitric acid, sulfuric acid, and fuming sulfuric acid; and an organic acid such as formic acid, acetic acid, chloroacetic acid, dichloroacetic acid, oxalic acid, trifluoroacetic acid, and trichloroacetic acid. These basic or acidic substances may be used as a mixture with the various solvents as mentioned above, or each of the substances may be used separately.

In addition, the present invention may be effected by dissolving an oxidizing agent or a reducing agent into the foregoing solvents. Although there is no particular restriction as to the oxidizing agent, nitrate, hypochlorite, permanganate, peroxide, and so forth may be mentioned. As to the reducing agent, lithium aluminum hydride, sodium borohydride, hydrazine, hydrazine hydrate, sulfite, and so forth may be mentioned.

To explain the foregoing solvents in more detail, an illustrative example of the alcohol compound solvent includes a linear alcohol such as methanol, ethanol, n-butanol, and n-propanol; a branched alcohol such as isopropanol, 2-butanol, tert-butanol and 1-methoxy-2-propanol; and a polyvalent alcohol such as ethylene glycol and diethylene glycol. An illustrative example of the ketone compound solvent includes acetone, methyl ethyl ketone, and cyclohexanone. An illustrative example of the ether compound solvent includes dimethyl ether, diethyl ether, tetrahydrofuran and propylene glycol monomethyl ether. An illustrative example of the aromatic compound solvent includes nitrobenzene, chlorobenzene, and dichlorobenzene. An illustrative example of the aliphatic compound solvent includes hexane. An illustrative example of the nitrile compound solvent includes acetonitrile. An illustrative example of the sulfoxide compound solvent includes dimethyl sulfoxide, diethyl sulfoxide, hexamethylene sulfoxide, and sulfolane. An illustrative example of the halogen-containing compound solvent includes chloroform, dichloromethane, trichloroethylene, and iodoform. An illustrative example of the ester compound solvent includes ethyl acetate, butyl acetate, methyl lactate, ethyl lactate, and 2-(1-methoxy)propyl acetate. An illustrative example of the ionic liquid includes a salt of 1-butyl-3-methyl imidazolium with PF6-(hexafluorophosphate ion). An illustrative example of the amide compound solvent includes N,N-dimethylformamide, 1-methyl-2-pyrrolidone, 2-pyrrolidinone, 1,3-dimethyl-2-imidazolidinone, 2-pyrrolidinone, $\epsilon$-caprolactam, formamide, N-methyl formamide, acetamide, N-methylacetamide, N,N-dimethylacetamide, N-methylpropaneamide, and hexamethylphosphoric triamide. An illustrative example of the carboxylic compound includes 2,2-dichloropropionic acid and squaric acid. An illustrative example of the sulfonic acid compound includes methanesulfonic acid, p-toluenesulfonic acid, chlorosulfonic acid, and trifluoromethane sulfonic acid.

As to the solvent for separation of the substance to be separated having a controlled amount of a dopant element by mixing with the raw material solution, solvents as the same as those mentioned above may be used. In accordance with the intended substance to be separated, a solvent for dissolution and a solvent for separation may be selected and used.

In the present invention, it is preferable that the solvent for separation be a mixed solvent, and that the mixing ratio thereof be controlled. By such a measure, solubilities of the substance to be separated and the dopant element or the dopant element-containing substances in the solvent for separation can be controlled thereby enabling to control an amount of the dopant element in the substance to be separated thus obtained. In the following, sodium-doped zinc oxide will be described as one illustrative example, though not particularly restricted thereby. As the raw material solution, a solution having zinc oxide powders dissolved into an aqueous sodium hydroxide is prepared (substance to be separated: zinc oxide, and dopant element-containing substance: sodium hydroxide), and as the solvent for separation, methanol or a mixed solvent of methanol and toluene is prepared. In the case that the raw material solution having zinc oxide powders dissolved into the aqueous sodium hydroxide is added into methanol, because sodium hydroxide is soluble in methanol (solubility: about 19.3 g/100-g (25° C.)), substantially only zinc oxide is separated out; and thus, zinc oxide with substantially 0% of doped sodium element concentration in the separated zinc oxide is obtained. In the case that a mixed solvent of methanol and toluene (for example, methanol:toluene=3:7 (weight ratio)) is used as the solvent for separation, because solubility of sodium hydroxide is lower as compared with the case of using only methanol as the solvent for separation, a condition of simultaneously separating zinc oxide and sodium hydroxide can be obtained. In this case, sodium is doped into the separated zinc oxide; and thus, sodium-doped zinc oxide can be obtained. Further, by changing this mixing ratio between methanol and toluene (solubility of sodium hydroxide is lower than in methanol, and sodium hydroxide is insoluble in toluene), sodium concentration (amount of dopant element) in zinc oxide can be easily controlled. In addition, because the present invention is a method for controlling an amount of a dopant element, the present invention includes the case that an amount of a dopant element in the substance to be separated is 0%.

In the present invention, it is preferable that the mixing of the raw material solution and the solvent to be separated by using a method wherein these fluids are stirred and mixed uniformly in a thin film fluid formed between processing surfaces arranged opposite to each other so as to be able to approach to and separate from each other, at least one of which rotates relative to the other. As to the apparatus to effect such mixing, the apparatus based on the same principle as the apparatus described in Patent Document 4 filed by the applicant of the present invention may be used. By using the apparatus based on the principle like this, the metal compound nanoparticles having a uniform and homogeneous spherical shape and having a controlled amount of a dopant element can be obtained.

Hereinafter, embodiments of the above-mentioned apparatus will be explained by using the drawings.

Figure 1:
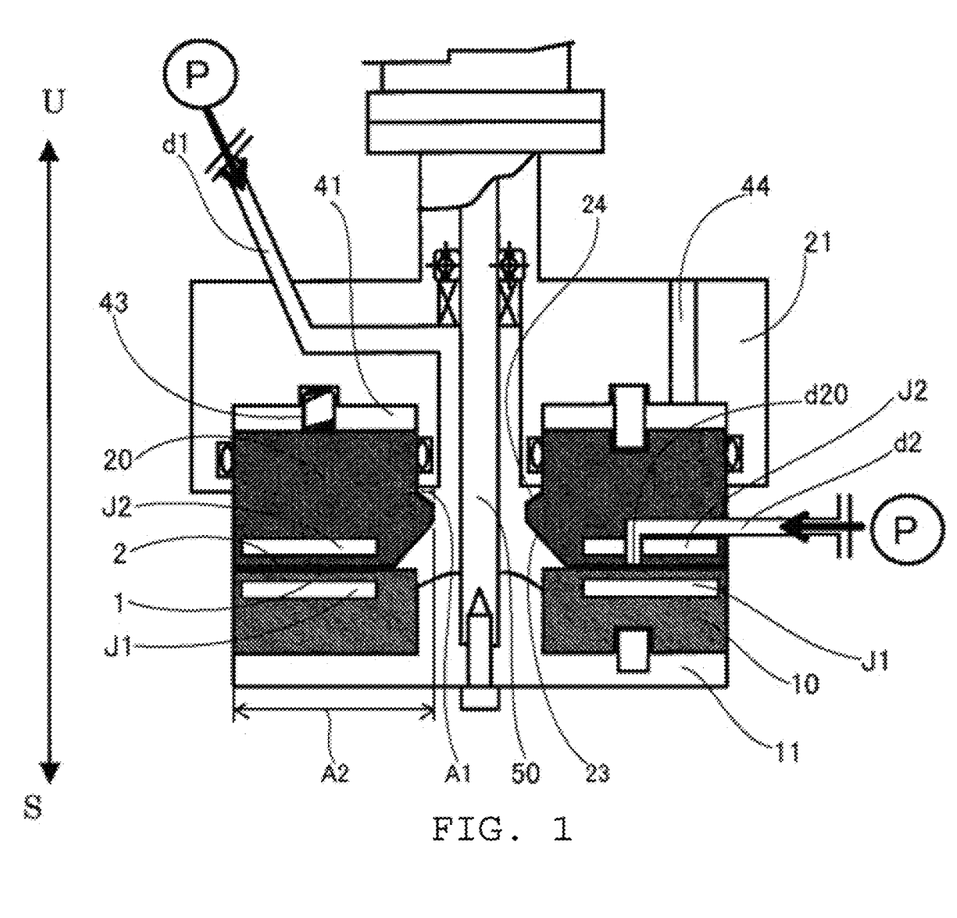
FIG. 1 is a schematic sectional view showing the fluid processing apparatus according to an embodiment of the present invention.
Figure 2:
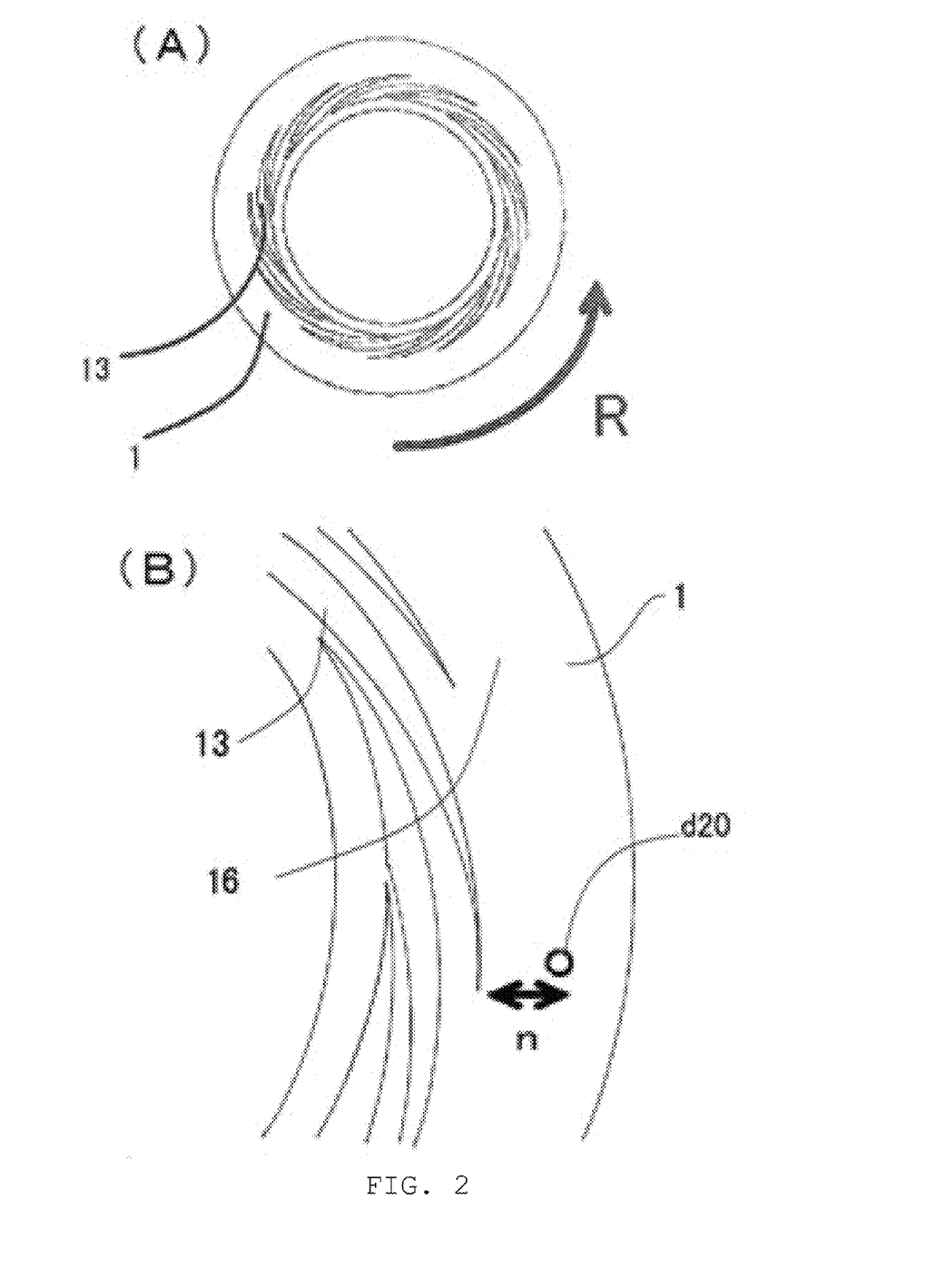
FIG. 2(A) is a schematic plane view of the first processing surface in the fluid processing apparatus shown in FIG. 1.
FIG. 2(B) is an enlarged view showing an important part of the processing surface in the apparatus.
Figure 3:
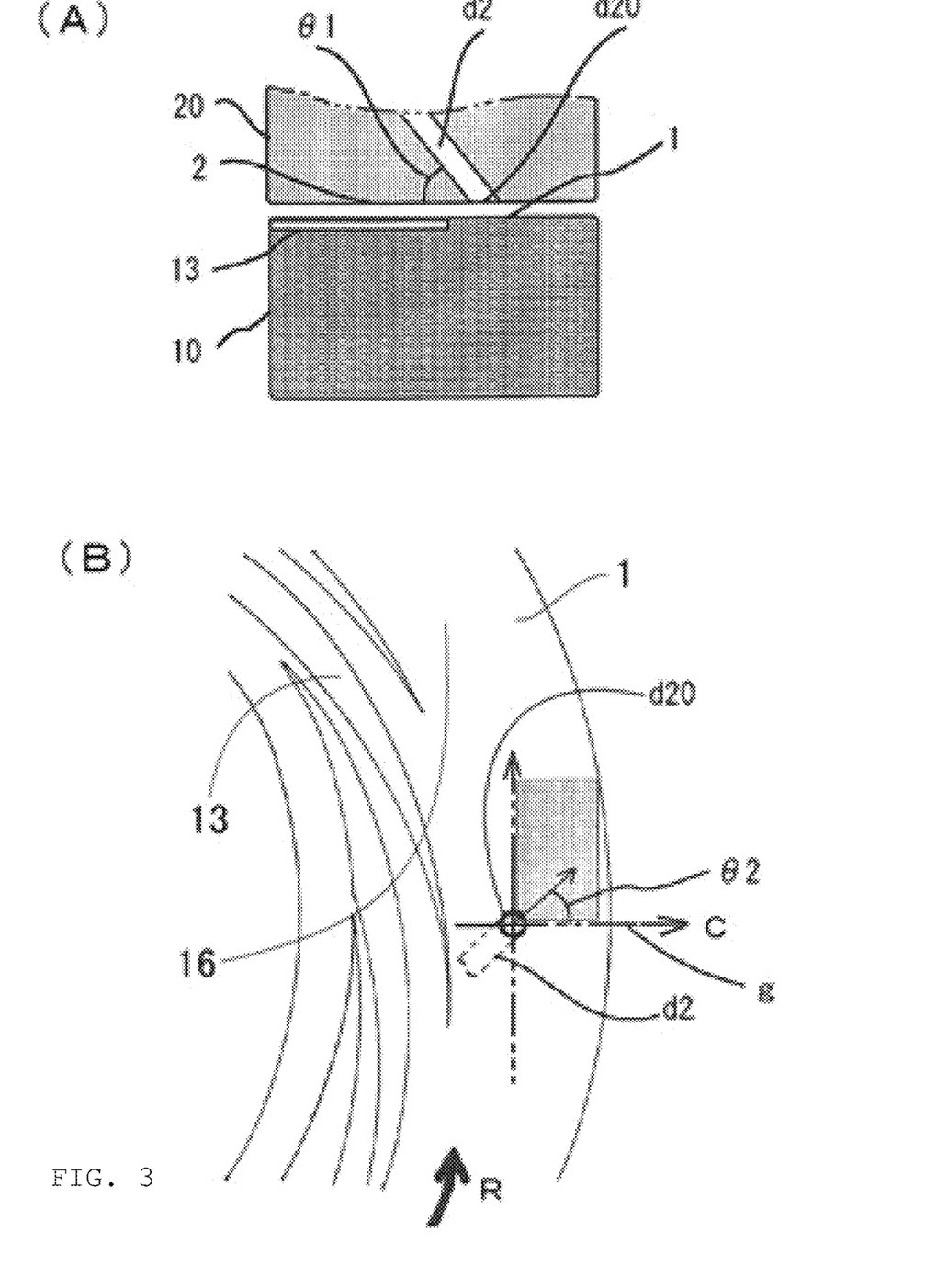
FIG. 3(A) is a sectional view of the second introduction path of the apparatus.
FIG. 3(B) is an enlarged view showing an important part of the processing surface for explaining the second introduction path.

The fluid processing apparatus shown in FIG. 1 to FIG. 3 is similar to the apparatus described in Patent Document 4, with which a material to be processed is processed between processing surfaces in processing members arranged so as to be able to approach to and separate from each other, at least one of which rotates relative to the other; wherein a first fluid containing a material to be processed is introduced into between the processing surfaces, and a second fluid containing a material to be processed is introduced into between the processing surfaces from a separate path that is independent of the flow path introducing the afore-mentioned fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, frond and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids to be processed are used, wherein at least one fluid thereof contains at least one kind of material to be processed, a thin film fluid is formed by converging the respective fluids between these processing surfaces, and the material to be processed is processed in this thin film fluid.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 µm to 50 µm. With this, the fluid to be processed passing through between the processing surfaces 1 and 2 becomes a forced thin film fluid forced by the processing surfaces 1 and 2.

This apparatus can process not only a single fluid to be processed but also a plurality of fluids to be processed. When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive member, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk with a ring form. A material of the processing members 10 and 20 is not only metal but also ceramics, sintered metal, abrasion-resistant steel, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 µm to 1.0 µm, or more preferably 0.03 µm to 0.3 µm.

At least one of the holders can rotate relative to the other holder by a rotation drive member such as an electric motor (not shown in drawings). A reference numeral 50 in FIG. 1 indicates a rotary shaft of the rotation drive member; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a flow path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism presses the first processing surface 1 of the first processing member 10 and the second processing surface 2 of the second processing member 20 in the direction to make them approach to each other, and generate a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 such as air and oil, wherein the surface-approaching pressure is provided by the spring 43 and the fluid pressure. The surface-approaching pressure may be provided by any one of this spring 43 and the fluid pressure; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing balance line, i.e., by changing the area A1 of the approach controlling surface 24.

Sliding surface actual surface pressure P, i.e., the fluid pressure out of the surface-approaching pressures, is calculated according to the following equation:

$$P=P1\times(K-k)+Ps$$

Here, P1 represents the pressure of a fluid to be processed, i.e., the fluid pressure, K represents the balance ratio, k represents an opening force coefficient, and Ps represents a spring and back pressure.

By controlling this balance line to control actual surface pressure P of the sliding surface, the space between the processing surfaces 1 and 2 is formed as a desired minute space, thereby forming a fluid film of the fluid to be processed so as to make a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. In processing, as shown in drawings, this is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in one of the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the depression may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

The base end of the depression 13 reaches preferably inner circumference of the first processing member 10. The front end of the depression 13 extends in an outer circumferential direction of the first processing surface 1 with the depth thereof (cross-sectional area) being gradually shallower as going from the base end toward the front end.

Between the front end of the depression 13 and the outer periphery of the first processing surface 1 is arranged a flat surface 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces 1 and 2. Specifically, in FIG. 2(B), a distance n from the outermost side of the depression 13 arranged in the first processing surface 1 in the radial direction is preferably about 0.5 mm or more. Especially in the case of separating nanoparticles from a fluid, it is preferable that mixing of a plurality of fluids to be processed and separation of the particles therefrom be effected under the condition of a laminar flow.

This second introduction part d2 may have directionality, and as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface, and it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening of the introduction part may be arranged just before the first and second processing surfaces 1 and 2 or in the side of further upstream thereof.

In the apparatus mentioned above, a solvent for separation as the first fluid and a solution containing a raw material solution having at least one substance to be separated and at least one dopant element or dopant element-containing substance dissolved therein as the second fluid are mixed in a thin film fluid formed between processing surfaces 1 and 2 which are arranged opposite to each other and are capable of approaching to and separating from, and at least one of which rotates relative to the other, whereby separating nanoparticles of a metal compound and so forth having controlled amount of a dopant element. Alternatively, a solution containing a raw material solution having at least one substance to be separated and at least one dopant element or dopant element-containing substance dissolved therein as the first fluid and a solvent for separation as the second fluid may be mixed in the foregoing apparatus, whereby separating nanoparticles of a metal compound and so forth having controlled amount of a dopant element. Further, the dopant element or the dopant element-containing substance may be dissolved into the solvent for separation, or may be dissolved both the raw material solution and the solvent for separation, and then they may be mixed.

The reaction accompanied with separation of the microparticles takes place in the apparatus shown in FIG. 1 under a forced and uniform mixing between the processing surfaces 1 and 2 arranged opposite to each other so as to be able to approach to and separate from each other, at least one of which rotates relative to the other.

Firstly, from one flow path, i.e., from the first introduction part d1, a first fluid containing a solvent for separation is introduced into between the processing surfaces 1 and 2 arranged opposite to each other so as to be able to approach to and separate from each other, at least one of which rotates relative to the other, whereby forming between these processing surfaces a first fluid film.

Then, from a different flow path, i.e., from the second introducing part d2, the raw material solution as a second fluid is introduced directly into the first fluid film formed between the processing surfaces 1 and 2.

With this, the first fluid and the second fluid are mixed between the processing surfaces 1 and 2 wherein the distance therebetween is fixed by the pressure balance between the supply pressure of the fluids to be processed and the pressure exerted between the rotating processing surfaces, whereby a reaction accompanied with separation of nanoparticles can be effected.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each solvent has a meaning for merely discriminating an $n^{th}$ fluid among a plurality of the fluids present; and therefore, a third or more fluids can also exist.

As mentioned above, the third introduction part d3, in addition to the first introduction part d1 and the second introduction part d2, may be arranged in the processing apparatus; and in this case, for example, an embodiment wherein a raw material solution not containing a dopant element-containing substance is introduced through the first introduction part d1 as the first fluid, a solution of a dopant element-containing substance is introduced through the second introduction part d2 as the second fluid, and a fluid containing a solvent for separation is introduced through the third introduction part 3 as the third fluid, each of these introductions into the processing apparatus being made separately, may be possible. Meanwhile, a combination of the fluids to be processed (the first to third fluids) introduced into the respective introduction parts may be set arbitrarily. By doing so, concentration and pressure of each solution can be controlled separately so that the reaction accompanied with separation and also a particle diameter of the nanoparticles can be controlled stably and more precisely. The same is true for the cases using introduction parts of the fourth or more; and thus, fluids to be introduced into the processing apparatus can be subdivided. In addition, the dopant element or the dopant element-containing substance may be dissolved in any one of the raw material solution and the solvent for separation or in both the raw material solution and the solvent for separation, and then they may be introduced into the processing apparatus.

EXAMPLES

Hereinafter, the present invention will be explained in more detail by Examples; but the present invention is not limited only to these Examples.

It is to be noted here that the term "from the center" in the following Examples means "from the first introduction part d1" of the fluid processing apparatus shown in FIG. 1; the first fluid means the first fluid to be processed as described before; and the second fluid means the second fluid to be processed that is introduced through the second introduction part d2 of the processing apparatus shown in FIG. 1, as described before.

Example 1-12

In Example 1-12, by using a reaction apparatus, as shown in FIG. 1, with which diffusion, stirring, and mixing are effected in a thin film fluid formed between the processing surfaces 1 and 2 arranged opposite to each other so as to be able to approach to and separate from each other, at least one of which rotates relative to the other, a raw material solution and a solvent for separation are mixed, whereby a reaction accompanied with crystallization is carried out in this thin film fluid.

From the center, as a first fluid, a mixed solvent of methanol and toluene, which were mixed with the condition shown in Table 1, was sent as the solvent for separation with a supply pressure of 0.50 MPa, a backpressure of 0.04 MPa, and a rotation number of 1700 rpm; and a raw material solution having zinc oxide powders dissolved in a 30% aqueous sodium hydroxide was introduced as a second fluid into between the processing surfaces at a rate of 5 mL/minute. The first fluid and the second fluid were mixed in the thin film; and sodium-doped zinc oxide nanoparticles were discharged from the processing surfaces as the metal compound nanoparticles. The solution-sending temperatures of the first fluid and the second fluid are shown as the processing temperatures in Table 1. These solution-sending temperatures were measured at the position just before where the first fluid and the second fluids were mixed (in other words, just before each fluid was introduced into the processing apparatus).

To remove impurities from the discharged dispersion solution of the metal compound nanoparticles, the metal compound nanoparticles were loosely agglomerated and spun down by a centrifugal separator (×8000G) for washing operation; and thus, after the supernatant solution thereof was removed, the metal compound nanoparticles were re-dispersed into pure water and then spun down again by using the centrifugal separator. After this washing operation was repeated three times, a paste of the metal compound nanoparticles finally obtained were dried at 60° C. with vacuum at −0.1 MPaG. ICP measurement was done with regard to the obtained metal compound nanoparticle powders; and from the measurement result, sodium concentration relative to zinc oxide was calculated.

Figure 4:
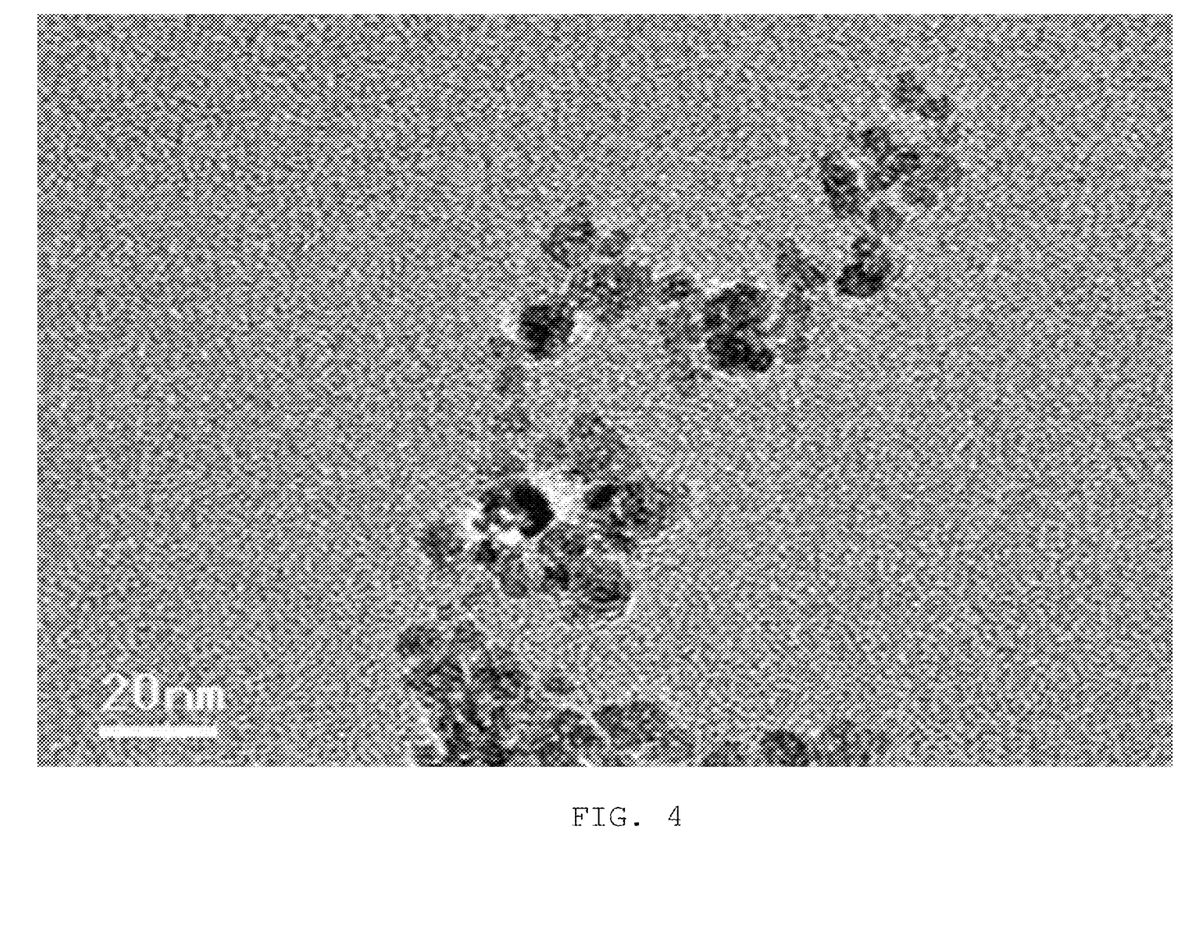
FIG. 4 shows a TEM picture of zinc oxide nanoparticles produced by Example of the present invention.
Figure 5:
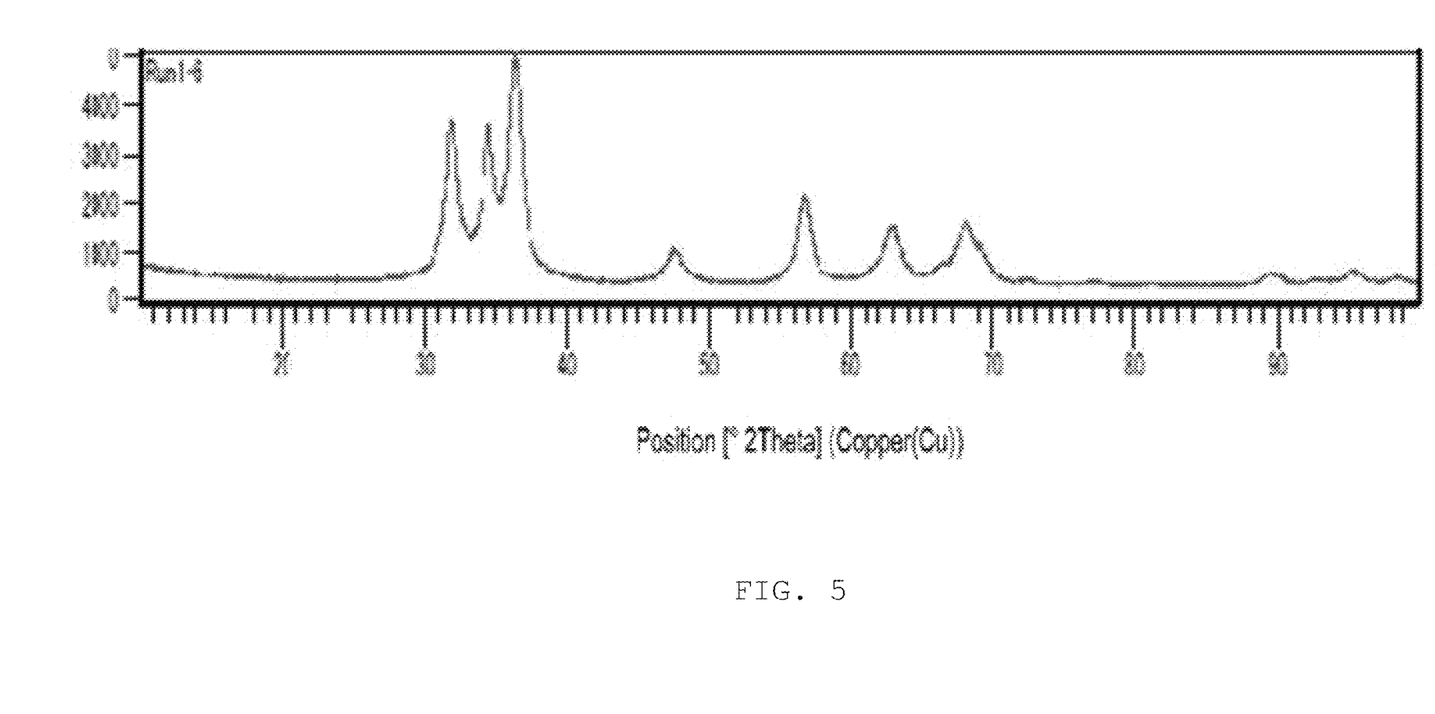
FIG. 5 is a graph showing the XRD measurement result of zinc oxide nanoparticles produced by Example of the present invention.

The results of experiments by changing the mixing ratio of methanol to toluene and the processing temperatures (solution-sending temperatures of the first fluid and the second fluid) are shown in Table 1 (Examples 1 to 12). A TEM picture of the metal compound (zinc oxide) nanoparticles produced in Example 1 is shown in FIG. 4, and the XRD measurement result thereof is shown in FIG. 5. From Table 1, it can be seen that added amount (doped amount) of sodium into zinc oxide can be controlled by using, as a solvent for separation of zinc oxide (as the first fluid), a mixed solvent of methanol and toluene with controlled mixing ratio.

In addition, by changing the solution-sending temperature of any of the first fluid and the second fluid, added amount (doped amount) of sodium into zinc oxide are changed.

Example 13-14

In Example 13-14, by using a reaction apparatus, as shown in FIG. 1, with which diffusion, stirring, and mixing are effected in a thin film fluid formed between the processing surfaces 1 and 2 arranged opposite to each other so as to be able to approach to and separate from each other, at least one of which rotates relative to the other, a raw material solution and a solvent for separation are mixed, whereby a reaction accompanied with crystallization is carried out in this thin From the center, as a first fluid, a mixed solvent of methanol and toluene, which were mixed with the condition shown in Table 2, was sent as the solvent for separation with a supply pressure of 0.50 MPa, a backpressure of 0.01 MPa, and a rotation number of 1700 rpm; and a raw material solution having silver acetate and manganese acetate dissolved in an aqueous acetic acid solution was introduced as a second fluid into between the processing surfaces at a rate of 5 mL/minute. The first fluid and the second fluid were mixed in the thin film; and manganese-doped silver acetate nanoparticles were discharged from the processing surfaces as the metal compound nanoparticles.

To remove impurities from the discharged dispersion solution of the metal compound nanoparticles, the metal compound nanoparticles were loosely agglomerated and spun down by a centrifugal separator (×23000G) for washing operation; and thus, after the supernatant solution thereof was removed, the metal compound nanoparticles were re-dispersed into pure water and then spun down again by using the centrifugal separator. After this washing operation was repeated three times, a paste of the metal compound nanoparticles finally obtained were dried at 60° C. with vacuum at −0.1 MPaG. ICP measurement was done with regard to the obtained metal compound nanoparticle powders; and from the measurement result, manganese concentration relative to silver acetate was calculated.

The results of experiments by changing the mixing ratio of methanol to toluene are shown in Table 2 (Examples 13 to 14). From Table 2, it can be seen that added amount (doped amount) of manganese into silver acetate can be controlled by using, as a solvent for separation of silver acetate (as the first fluid), a mixed solvent of methanol and toluene with controlled mixing ratio.

Example 15-17

In Example 15-17, by using a reaction apparatus, as shown in FIG. 1, with which diffusion, stirring, and mixing are effected in a thin film fluid formed between the processing surfaces 1 and 2 arranged opposite to each other so as to be able to approach to and separate from each other, at least one of which rotates relative to the other, a raw material solution and a solvent for separation are mixed, whereby a reaction accompanied with crystallization is carried out in this thin film fluid.

From the center, as a first fluid, a mixed solvent of aqueous sodium hydroxide (50% NaOH aq), methanol, and hexane (solubility of sodium hydroxide is lower than in methanol, and sodium hydroxide is insoluble in hexane), which were mixed with the condition shown in Table 3, was sent as the solvent for separation with a supply pressure of 0.30 MPa, a back pressure of 0.01 MPa, and a rotation number of 1700 rpm; and a raw material solution having magnesium oxide (MgO) dissolved in nitric acid (3N HNO$_3$ aq) was introduced as a second fluid into between the processing surfaces at a rate of 10 mL/minute. The first fluid and the second fluid were mixed in the thin film; and sodium-doped magnesium hydroxide nanoparticles were discharged from the processing surfaces as the metal compound nanoparticles.

To remove impurities from the discharged dispersion solution of the metal compound nanoparticles, the metal compound nanoparticles were loosely agglomerated and spun down by a centrifugal separator (×3500G) for washing operation; and thus, after the supernatant solution thereof was removed, the metal compound nanoparticles were re-dispersed into pure water and then spun down again by using the centrifugal separator. After this washing operation was repeated three times, a paste of the metal compound nanoparticles finally obtained were dried at 60° C. with vacuum at −0.1 MPaG. ICP measurement was done with regard to the obtained metal compound nanoparticle powders; and from the measurement result, sodium concentration relative to magnesium hydroxide was calculated.

The results of experiments by changing the mixing ratio of aqueous sodium hydroxide, methanol, and hexane are shown in Table 3 (Examples 15 to 17). From Table 3, it can be seen that added amount (doped amount) of sodium into magnesium hydroxide can be controlled by using, as a solvent for separation of magnesium hydroxide (as the first fluid), a mixed solvent of aqueous sodium hydroxide, methanol, and hexane with controlled mixing ratio thereamong.

TABLE 1

| Example | First fluid Methanol:toluene (weight ratio) | | Processing temperature (° C.) | | Element concentration ratio ICP Measurement result |
|---|---|---|---|---|---|
| | Methanol | Toluene | First fluid | Second fluid | Na/ZnO (mol %) |
| 1 | 1 | 0 | 25 | 25 | 0.0 |
| 2 | | | 65 | 60 | 0.0 |
| 3 | | | 80 | 60 | 0.0 |
| 4 | 7 | 3 | 25 | 25 | 0.2 |
| 5 | | | 65 | 60 | 3.8 |
| 6 | | | 80 | 60 | 7.8 |
| 7 | 1 | 1 | 25 | 25 | 1.5 |
| 8 | | | 65 | 60 | 4.8 |
| 9 | | | 80 | 60 | 9.7 |
| 10 | 3 | 7 | 25 | 25 | 5.6 |
| 11 | | | 65 | 60 | 7.1 |
| 12 | | | 80 | 60 | 12.6 |

TABLE 2

| Example | First fluid Methanol:toluene (weight ratio) | | Processing temperature (° C.) | | Element concentration ratio ICP Measurement result |
|---|---|---|---|---|---|
| | Methanol | Toluene | First fluid | Second fluid | Mn/AgAc (mol %) |
| 13 | 1 | 0 | 25 | 25 | 0.00 |
| 14 | 3 | 7 | 25 | 25 | 0.04 |

TABLE 3

| Example | First fluid 50% NaOH aq:methanol:hexane (weight ratio) | | | Processing temperature (° C.) | | Element concentration ratio ICP Measurement result |
|---|---|---|---|---|---|---|
| | 50% NaOHaq | Methanol | Hexane | First fluid | Second fluid | Na/Mg(OH)$_2$ (mol %) |
| 15 | 1% NaOHaq (not containing methanol nor hexane) | | | 20 | 20 | 0.100 |
| 16 | 2 | 78 | 20 | 20 | 20 | 0.121 |
| 17 | 2 | 48 | 50 | 20 | 20 | 0.222 |

EXPLANATION OF REFERENCE NUMERALS 1 first processing surface
2 second processing surface
10 first processing member
11 first holder
20 second processing member
21 second holder
d1 first introduction part
d2 second introduction part
d20 opening

The invention claimed is:
1. A method for separation, comprising the steps of:
providing at least two kinds of fluids to be processed, including a first fluid and a second fluid, the first fluid being a raw material solution containing a substance to be separated dissolved therein, the second fluid being at least one solvent for separation of the substance to be separated, the at least two kinds of fluids being in liquid phase;

dissolving at least one dopant element or dopant element-containing substance, different from said substance to be separated, in at least one of the at least two kinds of fluids;

introducing the at least two kinds of the fluids into a processing device, said processing device including two processing surfaces configured to be operated to approach to and separate from each other, at least one of the two processing surfaces rotating relative to the other;

mixing the at least two kinds of fluids in a minute space between the two processing surfaces to form a thin film fluid between the two processing surfaces;

producing, in the thin film fluid, a separated substance having a controlled amount of the dopant element, wherein an amount of the dopant element or the dopant element-containing substance that is dissolved into the solvent for separation is controlled so as to control an amount of the dopant element contained in the separated substance; and providing two separated introduction paths, which are independent of each other, for respectively introducing the at least two kinds of fluids into the minute space between the two processing surfaces from different directions.

2. The method for separation according to claim 1, wherein the substance to be separated is at least one metal or metal compound, and the solvent for separation is a solvent for separation of the said at least one metal or metal compound.

3. The method for separation according to claim 1, wherein at least one of the two separated introduction paths forms an opening on one of the two processing surfaces.

4. The method for separation according to claim 1, wherein the at least two kinds of fluids including a third fluid, the at least one dopant element or dopant element-containing substance is dissolved in the third fluid, and the method further comprises the step of:
providing three separated introduction paths, which are independent of each other, for respectively introducing the first fluid, the second fluid and the third fluid, at least two of the three separated introduction paths each forming an opening on one of the two processing surfaces.

5. The method for separation according to claim 4, wherein the first fluid and the second fluid are solutions not containing a dopant element or a dopant element-containing substance.

6. The method for separation according to claim 1, wherein the solvent for separation is a mixed solvent of a plurality of solvents, at least one solvent in the mixed solvent is a solvent capable of dissolving the substance to be separated and the dopant element or the dopant element-containing substance, at least one other solvent in the mixed solvent is a solvent which is capable of dissolving the substance to be separated and has a lower solubility of the dopant element or the dopant element-containing substance as compared with the said one solvent in the mixed solvent, the method further comprises the step of:
controlling a mixing ratio of the said at least one solvent and said at least one other solvent in the mixed solvent, whereby controlling the amount of the dopant element contained in the separated substance.

7. The method for separation according to claim 1, further comprising the step of:
controlling a temperature of the at least two kinds of fluids, whereby controlling the amount of the dopant element contained in the separated substance.

8. The method for separation according to claim 1, wherein the method further comprises the step of:
setting the amount of the at least one dopant element or the dopant element-containing substance that is dissolved into the solvent for separation a value such that the separated substance does not substantially contain the dopant element, said value being higher than a value of the amount of the at least one dopant element or the dopant element-containing substance that is dissolved into the solvent for separation in the case that the separated substance substantially contains the dopant element.

* * * * *